(No Model.)
B. B. & A. C. GRANT.
GUANO DISTRIBUTER.
No. 324,833. Patented Aug. 25, 1885.
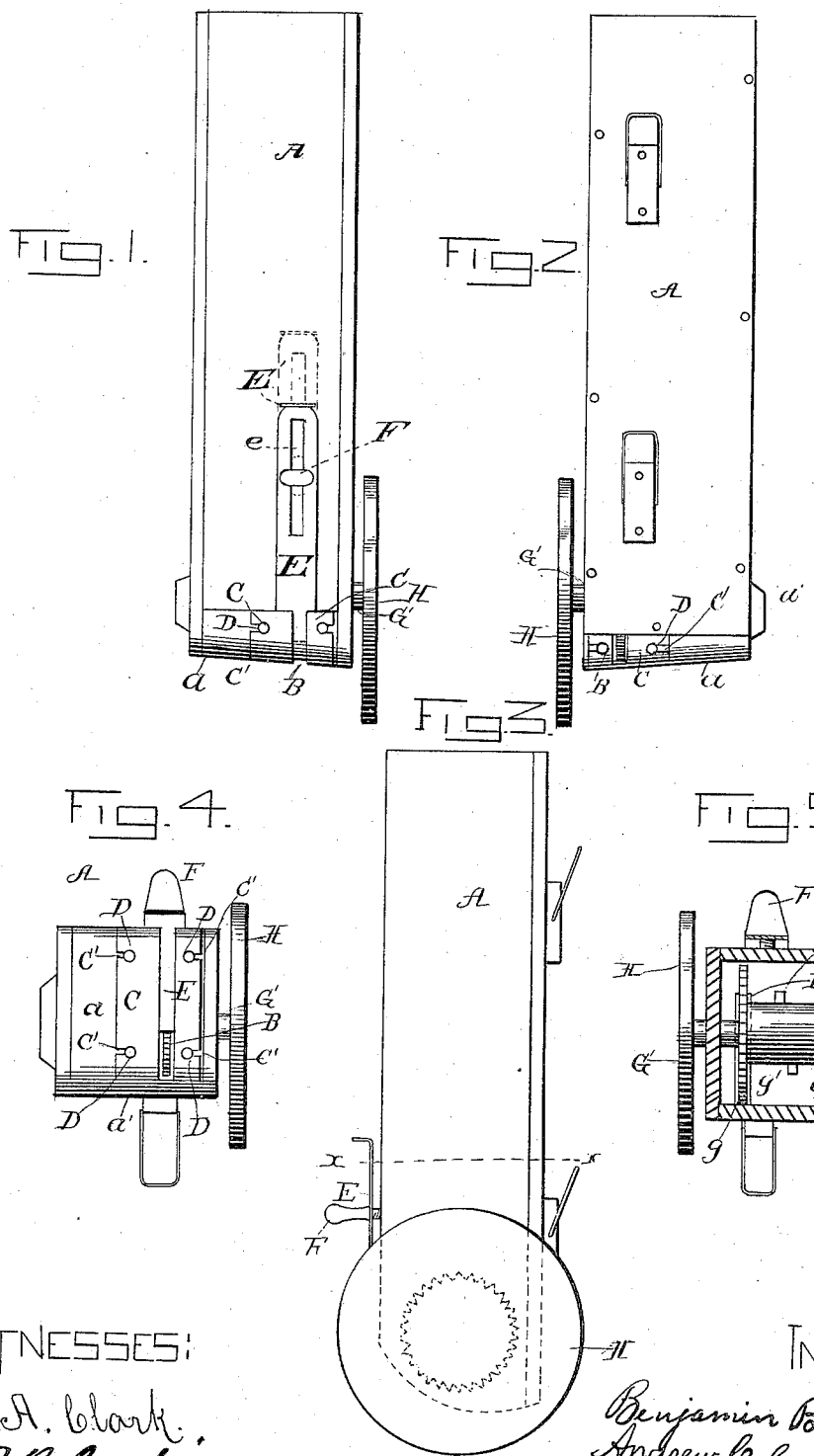
WITNESSES:
N. A. Clark
P. B. Turpin
INVENTOR
Benjamin B. Grant
Andrew C. Grant
By R. S. & A. Lacey ATTYS

UNITED STATES PATENT OFFICE.

BENJAMIN B. GRANT AND ANDREW C. GRANT, OF HAMILTON, GEORGIA.

GUANO-DISTRIBUTER.

SPECIFICATION forming part of Letters Patent No. 324,833, dated August 25, 1885.

Application filed August 6, 1884. (No model.)

*To all whom it may concern:*

Be it known that we, BENJAMIN B. GRANT and ANDREW C. GRANT, citizens of the United States, residing at Hamilton, in the county of Harris and State of Georgia, have invented certain new and useful Improvements in Guano-Distributers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices intended especially for distributing guano and other powdered commercial fertilizers; and it consists in the novel construction hereinafter described and claimed.

In the drawings, Figure 1 is a front elevation; Fig. 2, a rear elevation. Fig. 3 is a side elevation of a device constructed according to our invention. Fig. 4 is a bottom plan view of same. Fig. 5 is a transverse section, looking down, on line $x$ $x$, Fig. 3.

The box or hopper A has its bottom $a$ rounded from its front to its rear edge, and its rear edge is extended slightly below its forward one, as indicated in dotted lines, Fig. 3. This bottom is also inclined downward toward one side, $a'$, as shown in Figs. 1 and 2. Near this lower side we slot the bottom at B longitudinally from its rear almost to its forward edge, as shown in Figs. 4 and 5. Guide-plates C C are secured to the bottom $a$, on opposite sides of slots B, and may have their adjacent edges arranged about flush with the opposite edges of said slot, as will be understood from Figs. 4 and 5. These plates are preferably secured to the bottom by screws or headed nails D, passed through slots C', formed in the plates C transverse the length of same. By this construction the adjacent edges of the plates may be adjusted toward each other to vary the width of the slot.

The regulating-plate E has its lower end held over the slot B, its sides moving between the edges of plates C and the bottom $a$, and may be moved longitudinally, so as to vary the length of the feed-slot B. The plates C, it will be seen, serve the dual purpose of holding the main regulating-plate and coacting with said plate to vary the size of the feed-opening, and they vary and regulate the amount of outflow of seed or fertilizer to the desired quantity. The end of plate E is extended up along the front face of the box A, and may have its upper end, E', bent outward to form a handle, in order that the said plate may be easily manipulated. A slot, $e$, is formed through the plate near said upper end, and the set-screw F turns through said slot into the box, bearing on opposite sides of the slot, so the plate may be more securely clamped at any desired point of adjustment.

A shaft, G, is journaled in and extends transversely through the box A, near the bottom of same. A toothed wheel, $g$, is secured on this shaft within the box, and projects and operates within the slot B, as shown in Fig. 2. The shaft is also provided with radial pins or agitating-arms $g'$, in order to prevent clogging of the material in the bottom of the box. One end, G', of the shaft is extended beyond the box, and has the drive-wheel H keyed on it. The periphery of this wheel projects below the bottom of the box, and runs on the ground, giving the desired feeding rotation to the agitator and feed-shaft, as will be understood from the drawings.

In operation the direction of motion of the box is as indicated by arrow in Fig. 3, and the wheel H runs in the furrow, and rotates in the direction indicated by arrow thereon.

It will be understood that our machine may be used for sowing cotton or other small seed.

Having thus described our invention, what we claim, and desire to secure by Letters Patent, is—

1. The combination, with the box A, having its bottom provided with slot B, of the guide-plates C C, held to the bottom on opposite sides of an adjustable overslot, B, and the regulating-plate E, placed and adjustable longitudinally over slot B, the edges of said plate E being inserted between the adjacent edges of plates C and the bottom of the box, substantially as set forth.

2. The improved fertilizer-distributer herein described, comprising the box A, having its bottom $a$ provided with slot B, the plates C, provided with lateral slots C', and held to the bottom $a$ by screws passed through said slots, whereby the plates C may be adjusted laterally over the slot B, the plate E, having its lower end held and adjustable longitudinally over the slot B and its upper end provided with slot $e$, the screw F, passed through slot $e$ and turned into the box, and the shaft provided with feed-wheel $g$, agitators $g'$, and drive-wheel H, substantially as set forth.

In testimony whereof we affix our signatures in presence of two witnesses.

BENJAMIN B. GRANT.
    ANDREW C. GRANT.

Witnesses:
 H. C. CAMERON,
 J. R. LIVINGSTON.